(12) United States Patent
Ueda et al.

(10) Patent No.: US 8,793,045 B2
(45) Date of Patent: Jul. 29, 2014

(54) CONTROL DEVICE OF HYBRID DRIVE DEVICE

(75) Inventors: Yosuke Ueda, Ichinomiya (JP);
Yoshinori Ono, Nukata-Gun (JP);
Masaki Nomura, Anjo (JP); Wataru Shiraishi, Hiroshima (JP); Hiroaki Kioka, Toyoake (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 13/981,468

(22) PCT Filed: Feb. 29, 2012

(86) PCT No.: PCT/JP2012/055036
§ 371 (c)(1),
(2), (4) Date: Jul. 24, 2013

(87) PCT Pub. No.: WO2012/132722
PCT Pub. Date: Oct. 4, 2012

(65) Prior Publication Data
US 2013/0304296 A1 Nov. 14, 2013

(30) Foreign Application Priority Data

Mar. 25, 2011 (JP) ................. 2011-066890

(51) Int. Cl.
| | |
|---|---|
| *B60W 20/00* | (2006.01) |
| *B60W 10/04* | (2006.01) |
| *B60W 10/10* | (2012.01) |
| *B60K 6/48* | (2007.10) |
| *B60W 10/02* | (2006.01) |
| *B60W 10/06* | (2006.01) |
| *B60W 10/08* | (2006.01) |
| *B60W 10/11* | (2012.01) |
| *F16H 15/42* | (2006.01) |

(52) U.S. Cl.
CPC .............. *B60W 20/40* (2013.01); *B60W 10/04* (2013.01); *B60W 10/10* (2013.01); *B60W 20/10* (2013.01); *B60W 20/108* (2013.01); *B60W 20/20* (2013.01); *B60K 6/48* (2013.01); *B60K 2006/4825* (2013.01); *B60W 10/02* (2013.01); *B60W 10/06* (2013.01); *B60W 10/08* (2013.01); *B60W 10/11* (2013.01); *B60W 20/00* (2013.01); *B60W 20/30* (2013.01); *B60W 2710/083* (2013.01); *B60W 2710/1005* (2013.01); *F16H 15/42* (2013.01); *Y02T 10/6286* (2013.01); *B60W 2600/00* (2013.01); *Y10S 903/93* (2013.01); *Y02T 10/6221* (2013.01); *Y02T 10/6252* (2013.01)
USPC ................... 701/22; 701/36; 701/48; 701/51; 701/54; 477/34; 180/65.22; 180/65.225; 180/65.265; 180/65.28; 180/65.7; 903/930

(58) Field of Classification Search
None
See application file for complete search history.

(56) References Cited

U.S. PATENT DOCUMENTS

| | | | |
|---|---|---|---|
| 6,908,413 B2 * | 6/2005 | Ayabe et al. .................. 477/109 |
| 7,670,257 B2 * | 3/2010 | Popp et al. ......................... 477/6 |
| 7,766,107 B2 | 8/2010 | Joe et al. | |
| 7,770,675 B2 * | 8/2010 | Hayashi ................... 180/65.265 |
| 8,316,810 B2 * | 11/2012 | Holz et al. ................. 123/179.4 |
| 8,414,450 B2 * | 4/2013 | Ueno et al. ......................... 477/5 |
| 8,491,442 B2 * | 7/2013 | Saito et al. ......................... 477/6 |
| 8,498,765 B2 * | 7/2013 | Tajima et al. ................... 701/22 |
| 8,577,532 B2 * | 11/2013 | Muta ............................... 701/22 |
| 8,688,299 B2 * | 4/2014 | Saito et al. ..................... 701/22 |
| 8,712,622 B2 * | 4/2014 | Ito et al. .......................... 701/22 |
| 2001/0044683 A1 * | 11/2001 | Takaoka et al. ................ 701/22 |
| 2004/0009842 A1 * | 1/2004 | Inada ................................. 477/5 |
| 2005/0211479 A1 * | 9/2005 | Tamor ........................ 180/65.2 |
| 2006/0089235 A1 * | 4/2006 | Kobayashi ................... 477/107 |
| 2006/0090940 A1 * | 5/2006 | Ito et al. ...................... 180/65.2 |
| 2006/0243501 A1 * | 11/2006 | Hidaka ........................ 180/65.1 |
| 2007/0056783 A1 * | 3/2007 | Joe et al. ..................... 180/65.2 |
| 2007/0101965 A1 * | 5/2007 | Asahara et al. ............. 123/192.1 |
| 2007/0275818 A1 * | 11/2007 | Kouno ............................. 477/3 |
| 2008/0070745 A1 * | 3/2008 | Ogata ........................... 477/15 |
| 2008/0132378 A1 * | 6/2008 | Bouchon ......................... 477/3 |
| 2009/0233766 A1 * | 9/2009 | Kadota ......................... 477/176 |

| | | | |
|---|---|---|---|
| 2010/0004089 A1* | 1/2010 | Iwase et al. | 477/3 |
| 2010/0108420 A1* | 5/2010 | Keiji | 180/65.275 |
| 2010/0114442 A1* | 5/2010 | Kadota | 701/68 |
| 2010/0204005 A1* | 8/2010 | Kaltenbach | 477/5 |
| 2010/0273604 A1* | 10/2010 | Imaseki | 477/5 |
| 2011/0239801 A1* | 10/2011 | Inagaki et al. | 74/473.1 |
| 2013/0124027 A1* | 5/2013 | Tanishima et al. | 701/22 |

FOREIGN PATENT DOCUMENTS

| | | |
|---|---|---|
| JP | A-9-308009 | 11/1997 |
| JP | A-11-82260 | 3/1999 |
| JP | A-2002-120569 | 4/2002 |
| JP | A-2007-69789 | 3/2007 |
| JP | A-2009-35188 | 2/2009 |
| JP | A-2010-143426 | 7/2010 |
| JP | A-2010-149560 | 7/2010 |
| JP | A-2010-202150 | 9/2010 |
| JP | A-2010-536628 | 12/2010 |

OTHER PUBLICATIONS

Mar. 27, 2012 International Search Report issued in International Application No. PCT/JP2012/055036 (with translation).

* cited by examiner

*Primary Examiner* — Jonathan M Dager

(74) *Attorney, Agent, or Firm* — Oliff PLC

(57) ABSTRACT

A hybrid drive device includes a speed change mechanism, a motor drivingly coupled to an input shaft, and a clutch interposed between an engine and an input shaft. Upon engine start during engine traveling, the clutch is engaged, and rotation of the engine is increased. A control device of the hybrid drive device includes start upshift control means that, according to the engagement control of the clutch upon engine start, upshifts the speed change mechanism to output inertia torque. Thus, when the engine is started, output torque as the sum of driving torque of the motor and the inertia torque is output to the driving wheel, which reduces hesitation upon engine start.

4 Claims, 5 Drawing Sheets

F I G . 2
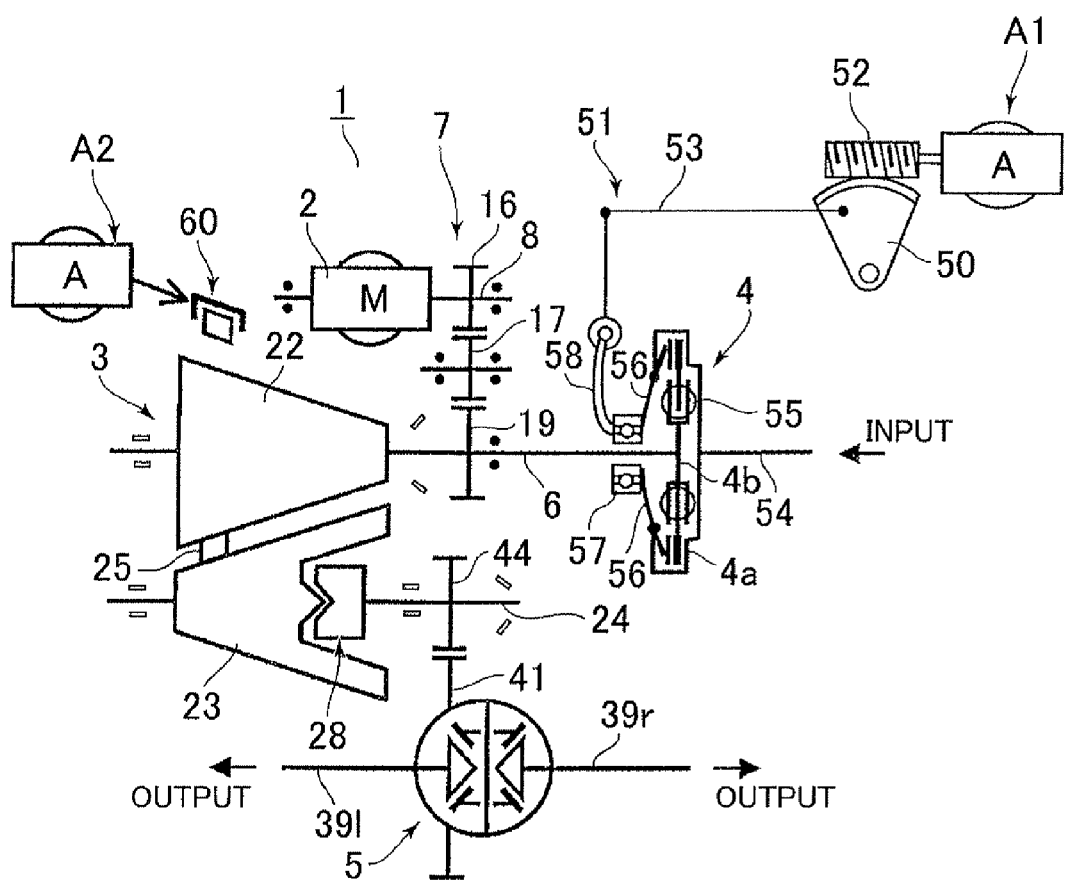

CONTROL DEVICE OF HYBRID DRIVE DEVICE

INCORPORATION BY REFERENCE

The disclosure of Japanese Patent Application No. 2011-066890 filed on Mar. 25, 2011 including the specification, drawings and abstract is incorporated herein by reference in its entirety.

BACKGROUND OF THE INVENTION

The present invention relates to control devices of hybrid drive devices which control, e.g., a speed change mechanism, a motor drivingly coupled to an input member of the speed change mechanism, and a clutch interposed between an engine and the input member, and more particularly to control devices of hybrid drive devices which engage a clutch to increase rotation of the engine when an engine is started.

DESCRIPTION OF THE RELATED ART

In recent years, various hybrid drive devices achieving improved fuel economy of vehicles have been developed in order to address environmental issues, etc. Among such hybrid drive devices, a so-called 1-motor parallel hybrid drive device has been proposed which includes a speed change mechanism, a motor drivingly coupled to an input member of the speed change mechanism, and a clutch interposed between an engine and the input member (see Japanese Patent Application Publication No. H11-82260 (JP H11-82260 A)).

In the hybrid drive device of JP H11-82260 A, EV traveling by the motor can be implemented with the clutch being disengaged to disconnect the engine. For example, if driver's requested torque exceeds motor torque during the EV traveling (the accelerator operation amount goes out of a predetermined low opening amount region), it is determined that the engine should be started, and the vehicle switches to a traveling state in which the driving forces of the engine and the motor are used.

SUMMARY OF THE INVENTION

In the 1-motor parallel hybrid drive device as described in the Patent Document 1, when the engine is started during EV traveling in which only the driving force of the motor is used, combustion of the engine is started after the rotational speed of the engine is increased by the driving force of the motor while the clutch is engaged.

When the engine is started, the hybrid drive device of Patent Document 1 disengages a clutch C1 of an automatic transmission. The hybrid drive device of Patent Document 1 thus starts the engine during coasting of the vehicle, thereby preventing transmission of cranking load of the engine to driving wheels, and preventing deceleration shock. However, in the case where the engine needs to be started, it is often the case that, e.g., the driver steps on an accelerator pedal to request increased output torque of the vehicle (i.e., acceleration of the vehicle). Accordingly, if acceleration of the vehicle is momentarily eliminated, this may cause a feeling of discomfort in terms of drivability.

However, even if, e.g., the clutch C1 is not disengaged, and the motor and the driving wheels are in a drive transmission state, part of the driving force of the motor is used to increase the rotational speed of the engine, causing so-called hesitation. Namely, acceleration of the vehicle momentarily slows down.

One way to prevent the hesitation is to allow the motor to constantly have enough power left to start the engine during EV traveling. However, this requires reduction in EV travel region so that the engine is started at an earlier timing. As a result, the engine is started more frequently, which hinders improvement in fuel economy of the vehicle.

It is an object of the present invention to provide a control device of a hybrid drive device capable of reducing hesitation that occurs upon engine start, without reducing an EV travel region.

According to an aspect of the present invention, a control device of a hybrid drive device (see, e.g., FIGS. 1 to 5) includes: a shift control unit that performs shift control of a speed change mechanism shifting a speed ratio between an input member and an output member drivingly coupled to a driving wheel; a motor control unit that performs drive control of a motor drivingly coupled to the input member; a clutch control unit that performs engagement control of a clutch interposed between an engine and the input member; an engine start determination unit that determines that the engine should be started, from a state where the clutch is disengaged during traveling of a vehicle to stop the engine and the vehicle is traveling by driving torque of the motor; an engine start control unit that, when it is determined by the engine start determination unit that the engine should be started, sends a command to the clutch control unit to perform the engagement control of the clutch and to increase torque capacity of the clutch, thereby increasing a rotational speed of the engine based on rotation of the input member, and starting combustion of the engine; and a start upshift control unit that, according to the engagement control of the clutch by the engine start control unit, sends a command to the shift control unit to upshift the speed ratio of the speed change mechanism to reduce a rotational speed of the input member, thereby generating inertia torque by the speed change mechanism. In the control device of the hybrid drive device, when the engine is started, output torque as a sum of the driving torque of the motor and the inertia torque is output to the driving wheel.

Thus, according to the engagement control of the clutch by the engine start control unit, the start upshift control unit sends a command to the shift control unit to upshift the speed ratio of the speed change mechanism to reduce the rotational speed of the input member, thereby generating the inertia torque by a rotating system on an input side of the hybrid drive device. Thus, the output torque as the sum of the driving torque of the motor and the inertia torque can be output to the driving wheels when the engine is started. Thus, hesitation that occurs upon engine start can be reduced without reducing, e.g., an EV travel region.

The control device of the hybrid drive device according to the aspect (see, e.g., FIG. 1) may further include: a requested torque detection unit that detects driver's requested torque. In the control device of the hybrid drive device, the start upshift control unit may control a magnitude of the inertia torque to be generated, by controlling a shift speed in the upshift based on the requested torque and the driving torque of the motor.

Thus, the start upshift control unit controls the magnitude of the inertia torque to be generated, by controlling the shift speed in the upshift based on the requested torque and the driving torque of the motor. Thus, the inertia torque of the rotating system on the input side of the hybrid drive device can be output according to the requested torque, and variation in output torque which occurs upon engine start can be accurately controlled.

In the control device of the hybrid drive device according to the aspect (see, e.g., FIGS. 1 and 2), the speed change mechanism may be a stepless speed change mechanism.

Since the speed change mechanism is a stepless speed change mechanism, the shift speed of the upshift can be controlled as appropriate, and appropriate inertia torque can be generated.

BRIEF DESCRIPTION OF THE DRAWINGS

FIG. 2 is a skeleton diagram showing the configuration of the hybrid drive device;

DETAILED DESCRIPTION OF THE EMBODIMENTS

[General Configuration of Hybrid Drive Device]

Figure 1:
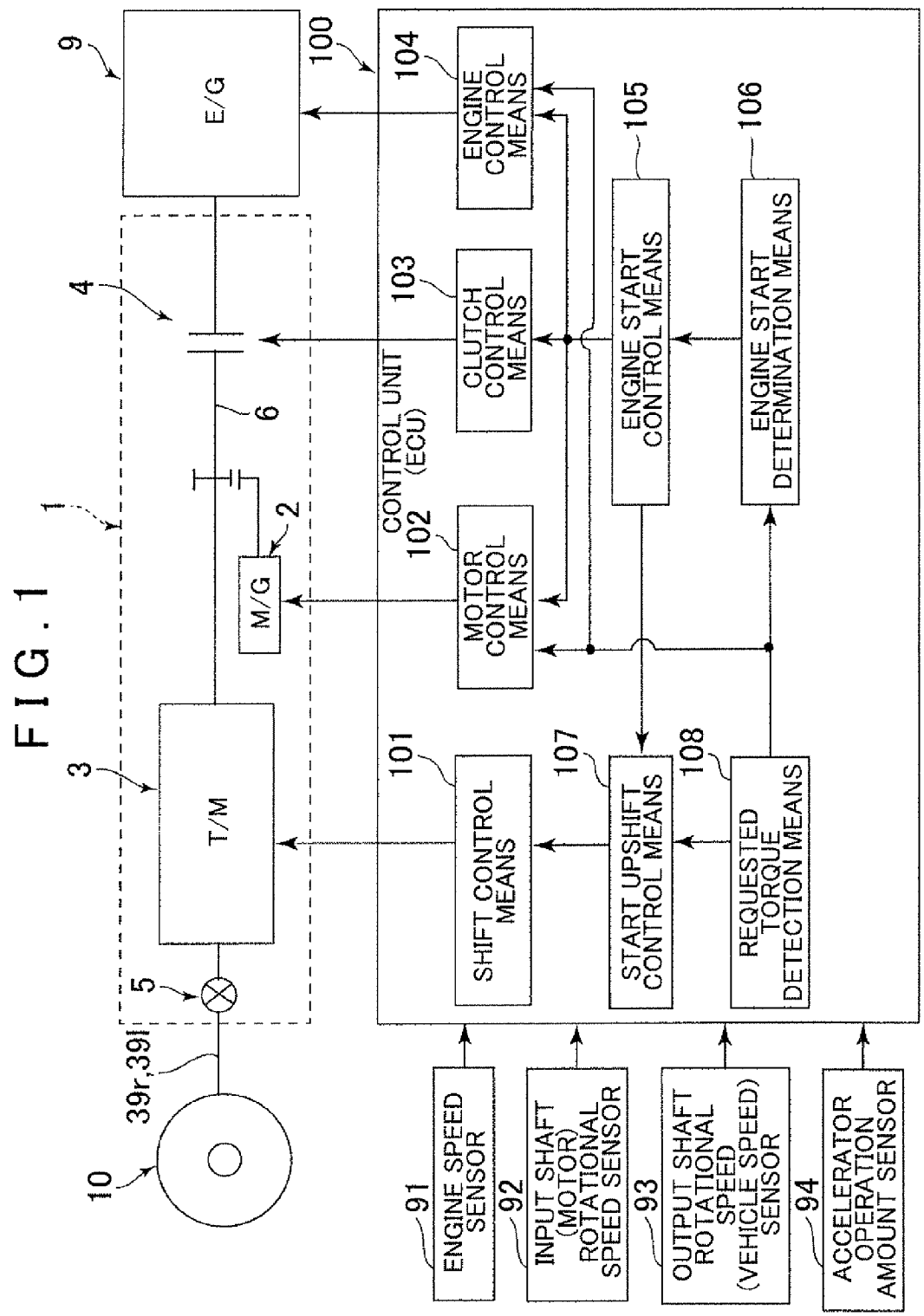
FIG. 1 is a block diagram showing a general configuration of a control device of a hybrid drive device according to an embodiment.
Figure 3:
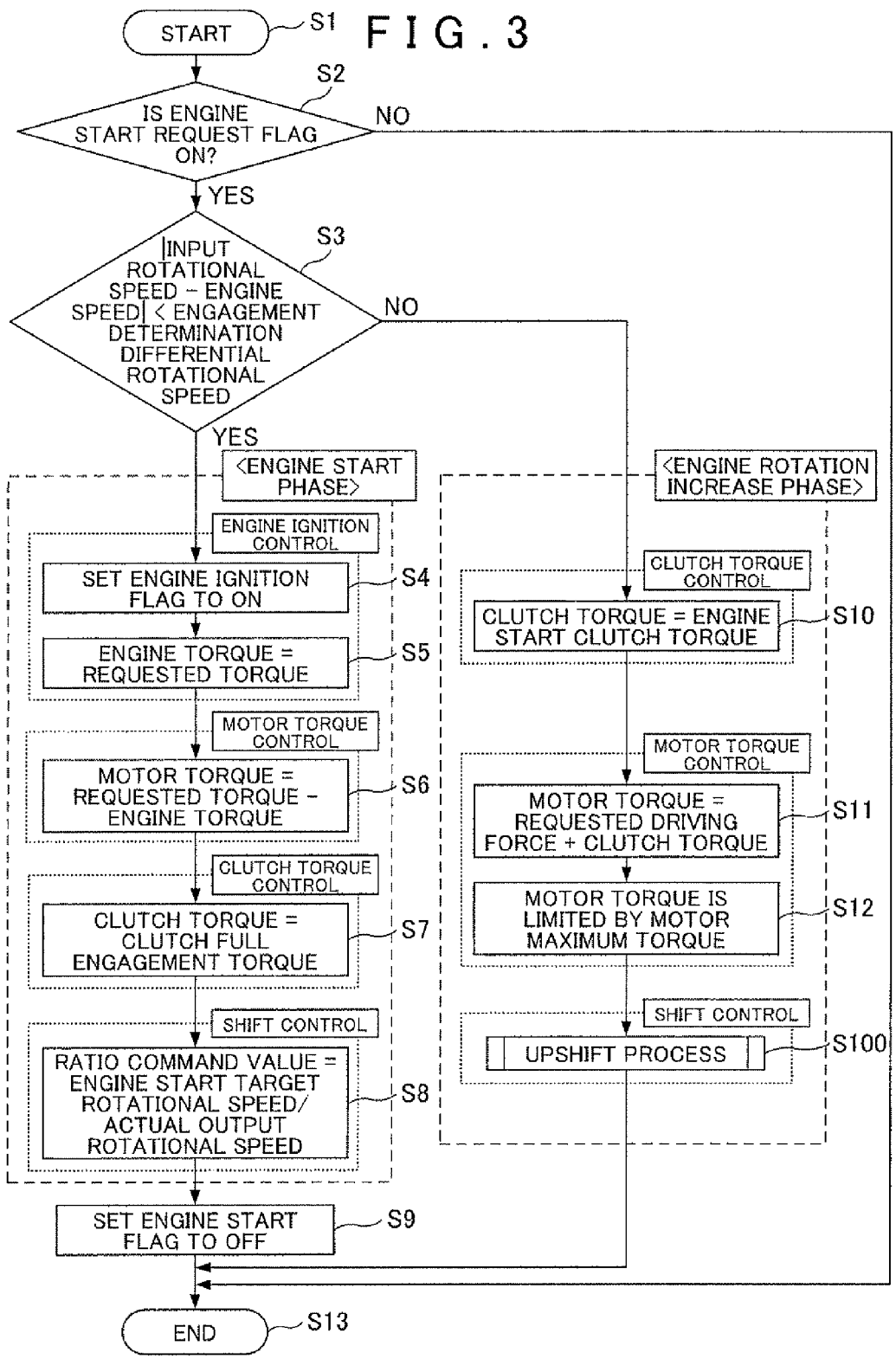
FIG. 3A and FIG. 3B are a main flowchart showing control that is performed by the control device of the hybrid drive device.

An embodiment according to the present invention will be described with reference to FIGS. 1 to 5. First, a drive system of a vehicle having a hybrid drive device 1 of the present invention mounted thereon will be described with reference to FIGS. 1 and 2. As shown in FIG. 1, the hybrid drive device 1 is placed so as to be interposed between an engine (E/G) 9 and driving wheels 10, and includes a speed change mechanism (T/M) 3 that changes the speed ratio between an input shaft (input member) 6 and axle shafts (output members) 39r, 39l drivingly coupled to the driving wheels 10 via a differential unit 5, a motor generator (M/G) 2 drivingly coupled to the input shaft 6, and a clutch 4 interposed between the engine 9 and the input shaft 6.

More specifically, as shown in FIG. 2, the clutch 4 is a dry single-plate clutch, and has a clutch disc 4a coupled to an engine output shaft 54, and a pressure plate 4b as an output side coupled to the input shaft 6 via a damper spring 55. The pressure plate 4b is constantly biased by a diaphragm spring 56 so as to be connected to the clutch disc 4a. A release bearing 57 rotatably contacts a central portion of the pressure plate 4b, and the clutch 4 is disconnected as the bearing 57 is pressed by a release fork 58. The release fork 58 is coupled to a worm wheel 50 via a rod 53, and a worm 52 that operates together with an output shaft of an electric motor A1 as an electric actuator meshes with the wheel 50.

The electric motor A1, the worm 52, the worm wheel 50, and the rod 53 form a clutch operating portion 51. The clutch 4 is operated to be engaged/disengaged by operating the clutch operating portion 51 based on the electric actuator (electric motor) A1, and the clutch 4 is held at its operated position (engaged or disengaged) via the worm 52 and the worm wheel 50 as the irreversible mechanism, as the electric motor A1 is stopped.

The motor generator (hereinafter simply referred to as the "motor") 2 has a stator (not shown) and a rotor (not shown) provided on a motor output shaft 8. The motor output shaft 8 has its both ends rotatably supported by a case member, not shown, via a bearing. An output gear 16 as a gear (pinion) is formed on one side of the motor output shaft 8. The output gear 16 meshes with an intermediate gear 19, which is provided on the input shaft 6, via an idler gear 17. The output gear 16, the idler gear 17, and the intermediate gear 19 form a gear transmission device 7 that drivingly couples the motor 2 and the input shaft 6.

The speed change mechanism 3 is a cone ring CVT as a so-called stepless speed change mechanism, and is formed by a conical input corn 22 connected to the input shaft 6 and serving as an input side, a conical output cone 23 serving as an output side, and a metal ring 25. The output cone 23 is placed on an axis parallel to that of the input corn 22, and is placed so that its larger diameter side and smaller diameter side are opposite in the axial direction from those of the input cone 22. The ring 25 is placed so as to be held between the opposing tilted surfaces of the cones 22, 23 and to surround one of the cones (in the present embodiment, the input cone 22).

At least one of both friction wheels is subjected to a large thrust force, and the ring 25 is held by a relatively large clamping force based on the thrust force. Specifically, an axial force applying mechanism 28 as a tilted cam mechanism having a ball interposed between axially opposing surfaces is provided between the output cone 23 and a stepless shift device output shaft 24. The axial force applying mechanism 28 applies a thrust force according to the transfer torque to the output cone 23, and applies a large clamping force to the ring 25 between the output cone 23 and the input cone 22 supported in a direction against the thrust force.

The ring 25 is moved and driven in the axial direction by an electric motor A2 as, e.g., an electric actuator, and the axial position of the ring 25 with respect to the cones 22, 23 is controlled by a shift operation mechanism 60 including a moving member that rotatably supports the ring 25. The contact radius of the ring 25 with the cones 22, 23 is thus changed, whereby the speed ratio is changed between the cones 22, 23.

A gear (pinion) 44 is formed on the stepless shift device output shaft 24 drivingly coupled to the output cone 23, and a differential ring gear 41 of the differential unit 5 meshes with the gear 44. The differential unit 5 outputs rotation transmitted to the differential ring gear 41 to the left and right axle shafts 39l, 39r while absorbing differential rotation between left and right sides, and transmits the rotation to the left and right driving wheels 10 drivingly coupled to the axle shafts 39l, 39r.

[Regarding Control Device of Hybrid Drive Device]

A control device 100 of the hybrid drive device 1 according to the present invention will be described with reference to FIGS. 1, 3A, 3B, and 4. As shown in FIG. 1, the control device (control unit (ECU)) 100 of the hybrid drive device 1 includes a shift control unit 101, a motor control unit 102, a clutch control unit 103, an engine control unit 104, an engine start control unit 105, an engine start determination unit 106, a start upshift control unit 107, a requested torque detection unit 108, etc.

An engine speed sensor 91 that detects an engine speed Ne, an input shaft (motor) rotational speed sensor 92 that detects the rotational speed of the input shaft 6 (the rotational speed of the motor 2), an output shaft rotational speed (vehicle speed) sensor 93 that detects the rotational speed of the axle shafts 39r, 39l or the stepless shift device output shaft 24 (i.e., the vehicle speed), an accelerator operation amount sensor 94 that detects the amount by which an accelerator pedal, not shown, has been stepped on (accelerator operation amount), etc. are connected to the control unit 100.

Although the present embodiment is described for convenience with respect to an example in which the shift control unit 101, the motor control unit 102, the clutch control unit 103, the engine control unit 104, etc. are provided in the same control unit (ECU) 100, these units may be provided in two or more control units (ECUs) so as to be able to communicate with each other, or may be provided in respective individual control units (ECUs).

During traveling, the shift control unit 101 refers to a map, not shown, etc. prepared in advance so that optimal fuel consumption of the engine 9 and optimal power consumption of the motor 2 are achieved (so that satisfactory fuel economy is achieved while a requested driving force is output), based on, e.g., the vehicle speed V that is detected by the output shaft rotational speed sensor 93 and the accelerator operation amount that is detected by the accelerator operation amount sensor 94 (driver's requested torque Tr that is detected by the requested torque detection unit 108). The shift control unit 101 thus determines an optimal speed ratio as needed, and performs drive control of the electric motor A2 to perform shift control of the speed ratio of the speed change mechanism 3.

During EV traveling during which the vehicle travels by using only the driving force of the motor 2, the motor control unit 102 controls the magnitude of the driving torque (hereinafter referred to as the "motor torque") Tm of the motor 2 so that the driver's requested torque Tr detected by the requested torque detection unit 108 is output from the driving wheels 10. During engine traveling during which the vehicle travels by using the driving force of the engine 9, the motor control unit 102 controls the magnitude of the motor torque Tm (including power running and regeneration) so that the sum of the output torque (hereinafter referred to as the "engine torque") Te of the engine 9 and the motor torque Tm is equal to the requested torque Tr that is output from the driving wheels 10. The motor control unit 102 performs constant power control of the motor 2, and thus can control the magnitude of the motor torque Tm so that constant motor torque Tm is output to the driving wheels 10 regardless of the motor rotational speed (the speed ratio of the speed change mechanism 3).

During the EV traveling, the clutch control unit 103 performs drive control of the electric motor A1 so as to disengage the clutch 4. During the engine traveling, the clutch control unit 103 performs drive control of the electric motor A1 so as to engage the clutch 4. As described in detail below, when the engine 9 is started, the clutch control unit 103 performs slip control of the clutch 4 to control transfer torque capacity (hereinafter referred to as the "clutch torque") Tc of the clutch 4 so the engine speed Ne (the rotational speed of the engine 9) is increased. When implementing reverse traveling by the hybrid drive device 1, the clutch control unit 103 performs disengagement control of the clutch 4 and reverse-rotates the motor 2 to achieve reverse rotation of the driving wheels 10.

During the engine traveling, the engine control unit 104 controls the throttle opening, the fuel injection amount, etc. in the engine 9 to control the engine torque Te and the engine speed Ne as desired. When the engine is started, which will be described in detail below, the engine control unit 104 performs ignition control of the engine 9 based on a command from the engine start control unit 105.

If the driver's requested torque Tr detected by the requested torque detection unit 108 (i.e., the accelerator operation amount) exceeds an EV travelable region in which the vehicle can travel by the motor 2, and which is referred to by, e.g., a map, not shown, during the EV traveling during which the clutch 4 is disengaged and the engine 9 is stopped (during traveling of the vehicle), the engine start determination unit 106 determines that the driving force of the engine 9 is required, and determines that the engine should be started.

When it is determined by the engine start determination unit 106 that the engine 9 should be started, the engine start control unit 105 sends a command to the clutch control unit 103 to perform engagement control of the clutch 4 and to increase the torque capacity of the clutch 4, which increases the engine speed Ne based on rotation of the input shaft 6. The engine start control unit 105 also sends a command to the engine control unit 104 to start combustion (ignition) of the engine 9.

As described in detail below, according to the engagement control of the clutch 4 by the clutch control unit 103 in response to the command from engine start control unit 105, the start upshift control unit 107 sends a command to the shift control unit 101 to upshift the speed ratio of the speed change mechanism 3 to reduce the rotational speed of the input shaft 6, which generates inertia torque by the rotating members on the input side of the hybrid drive device 1 (i.e., the input cone 22, the input shaft 6, the gear transmission device 7, the motor output shaft 8, the rotor of the motor 2, etc.)

[Regarding Upshift Control Upon Engine Start]

Figure 4:
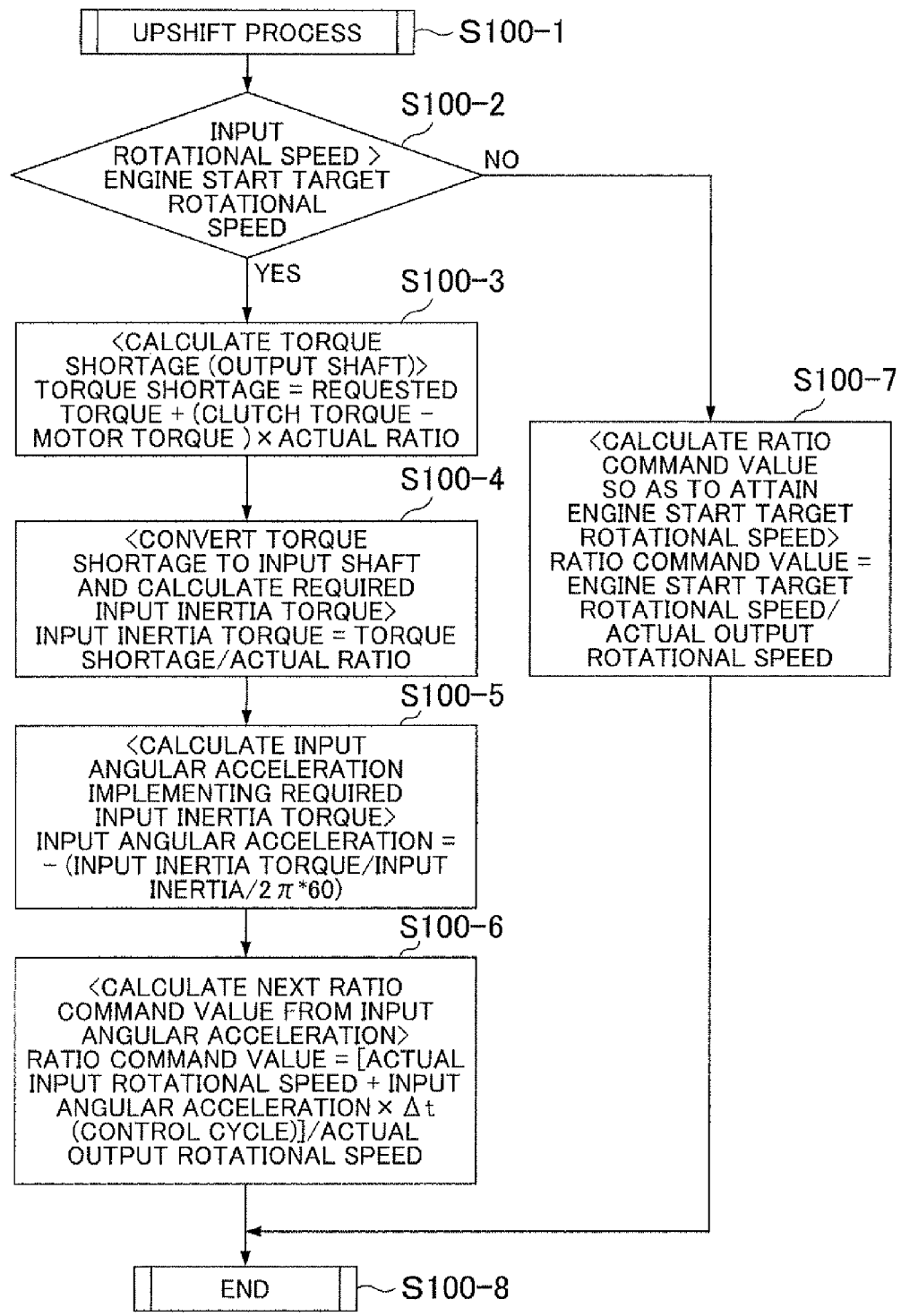
FIG. 4 is a sub flowchart showing control of an upshift process.

Control by the control unit 100 upon engine start will be described in detail based on the flowcharts of FIGS. 3A, 3B and 4 with reference to FIG. 1.

As shown in FIGS. 3A and 3B, if, e.g., the vehicle has started to travel, particularly in the EV traveling state, and engine start control has been started (S1) and the engine start determination unit 106 has not determined that the engine 9 should be started, no engine start request flag is output from the engine start determination unit 106 (the flag is OFF) (NO in S2). Accordingly, the program returns (S 13) and waits until the engine start determination unit 106 determines that the engine should be started.

As described above, if the driver's requested torque Tr detected by the requested torque detection unit 108 exceeds the EV travelable region in which the vehicle can travel by the motor 2, the engine start determination unit 106 determines that the engine should be started, and the engine start determination unit 106 sets the engine start request flag to on (YES in S2), and the program proceeds to step S3.

(Engine Rotation Increase Phase)

In step S3, the engine start control unit 105 determines if differential rotation between the rotational speed of the input shaft 6 (input rotational speed Nin) and the engine speed Ne is smaller than a predetermined engagement determination differential rotational speed (the rotational speed from which it can be determined that the clutch 4 is in an engaged state). Since the vehicle is in the EV traveling state in which the engine 9 is stopped, the differential rotation between the input rotational speed Nin and the engine speed Ne is equal to or larger than the engagement determination differential rotation (the clutch 4 is in a disengaged state and the differential rotation is large) (NO in S3), the program enters an "engine rotation increase phase," and proceeds to "clutch torque control" (S10) that controls the clutch torque Tc of the clutch 4 by the clutch control unit 103.

When the program proceeds to the "clutch torque control," the clutch control unit 103 sets the magnitude of the clutch torque Tc to engine start clutch torque Tef that is slightly larger than friction torque of the engine 9 (internal friction resistance of the engine 9 and engine inertia torque), and the clutch control unit 103 sends a command to the electric motor A1 to gradually perform slip engagement control of the clutch 4 so that the clutch torque Tc increases to the set engine start clutch torque Tef. The clutch torque Tc thus becomes larger than the friction torque of the engine 9, whereby the engine speed Ne is gradually increased by rotation of the input shaft 6.

After the "clutch torque control" is performed, the motor control unit 102 performs "motor torque control" (S11, S12)

that controls the motor torque Tm. That is, the motor control unit 102 sets the motor torque Tm to the sum of the requested torque Tr detected by the requested torque detection unit 108 and the set clutch torque Tc (engine start clutch torque), and sends a command to the motor 2 to output the set motor torque Tm (S11). Actually, however, since the motor 2 has its output performance limit, the motor torque Tm is output (S12) as the sum of the motor torque in the EV traveling state and the additional torque Tmup with the limitation by the motor maximum torque which is the output performance limit. If the requested torque Tr increases thereafter, torque shortage is caused as described below (see S100-3).

After the "motor torque control" is performed, the start upshift control unit 107 performs "shift control" that performs upshift control of the speed ratio of the speed change mechanism 3. That is, in this "shift control," the start upshift control unit 107 performs control of an "upshift process" as shown in FIG. 4.

When the "upshift process" is started (S100-1), the start upshift control unit 107 first determines if the rotational speed of the input shaft 6 (the input rotational speed Nin) is higher than an engine start target rotational speed (S100-2). If the input rotational speed Nin is equal to or lower than the engine start target rotational speed (NO in S100-2), upshift is not performed and the program proceeds to step S100-7. The reason for this is as follows. In this case, if any upshift is performed, the input rotational speed Nin becomes lower than the engine start target rotational speed, and thus the engine 9 makes row rotation when the clutch 4 is engaged, which makes it difficult to start the engine.

If the program proceeds to step S100-7, the engine start target rotational speed divided by an actual output rotational speed Nout is set as a command value of the speed ratio (ratio command value) so that the input rotational speed Nin becomes equal to the engine start target rotational speed. The shift control unit 101 sends a command to the electric motor A2 to control the speed ratio of the speed change mechanism 3 to the set ratio command value. In this case, downshift may be performed depending on the magnitude of the input rotational speed Nin.

If the motor torque Tm is increased, but cannot be increased to the sum of the requested toque Tr and the clutch torque Tc due to the performance limit of the motor 2, the torque that is output to the driving wheels 10 is slightly insufficient. This causes hesitation associated with engine start. However, the engine speed Ne is increased to the input rotational speed Nin attaining rotation at the speed ratio based on the set ratio command value, when the clutch 4 is engaged. Thus, the engine speed Ne is increased to the engine start target rotational speed, and engine start is achieved.

On the other hand, if the input rotational speed Nin is higher than the engine start target rotational speed in step S100-2 (YES in S100-2), upshift can be performed until the input rotational speed Nin is equal to the engine start target rotational speed. Thus, in order to compensate for the torque shortage relative to the requested torque Tr due to the output performance limit of the motor 2 by the inertia torque upon upshift, the start upshift control unit 107 calculates the ratio command value for upshift, and the shift control unit 101 sends a command to the electric motor A2 to control the speed ratio of the speed change mechanism 3.

Specifically, in step S100-3, the torque shortage in the driving wheels 10 is calculated by subtracting the current motor torque Tm (the motor torque Tm as the sum of the motor torque during EV traveling and the additional torque up to the output performance limit) from the clutch torque Tc, multiplying the difference thus obtained by the actual speed ratio (e.g., a value obtained by dividing the actual input rotational speed Nin detected by the input shaft rotational speed sensor 92 by the actual output rotational speed Nout detected by the output shaft rotational speed sensor 93), and adding the product thus obtained to the requested torque Tr detected by the requested torque detection unit 108.

Next, in step S100-4, the calculated torque shortage is divided by the actual speed ratio so that the torque shortage is converted to the input torque, namely input inertia torque required as torque that compensates for the shortage is calculated. Then, in step S100-5, input angular acceleration that implements the required input inertia torque is calculated by dividing the calculated input inertia torque by input inertia (the weight of the rotating members on the input side of the speed change mechanism 3 described above) and matching the system of units (e.g., multiplying by 60 to change "per minute" to "per second," and dividing by $2\pi$ to calculate in angular acceleration).

Thereafter, in step S100-6, the next ratio command value to be sent as a command to the speed change mechanism 3 is calculated by adding the actual input rotational speed Nin to the input angular acceleration multiplied by a predetermined control cycle (cycle of repeating step S100-6) $\Delta t$, and dividing the sum thus obtained by the actual output rotational speed Nout. The ratio command value thus calculated is sent to the speed change mechanism 3 as a command from the shift control unit 101 to the electric motor A2, whereby upshift control of the speed ratio is performed so that inertia torque Ti compensating for the shortage is output.

This control is repeated until the differential rotation between the input rotational speed Nin and the engine speed Ne is smaller than the predetermined engagement determination differential rotational speed (that is, the differential rotation of the clutch 4 is substantially eliminated and the clutch 4 is brought into an engaged state) (i.e., S1, YES in S2, NO in S3, S10, S11, S12, S100, S13 in FIGS. 3A and 3B). Thus, the torque shortage of the motor torque Tm (the additional torque Tmup added to the motor torque during EV traveling) with respect to the sum of the driver's requested torque Tr and the clutch torque Tc (engine friction torque) can be compensated for by the inertia torque Ti as needed by controlling the shift speed of the upshift (by changing the speed ratio in every control cycle). Accordingly, the output torque Tout from the driving wheels 10 is output as requested by the requested torque Tr, whereby hesitation is prevented.

(Engine Start Phase)

As shown in FIGS. 3A and 3B, if it is determined in step S3 that the differential rotation between the input rotational speed Nin and the engine speed Ne is smaller than the predetermined engagement determination differential rotational speed (YES in S3), the program enters an "engine start phase" and proceeds to "engine ignition control" that ignites and starts the engine 9 by the engine start control unit 105 (S4, S5, S6, S7, S8). In the "engine ignition control," the engine start control unit 105 sets an engine ignition flag to on (S4), and sets the engine torque Te to the driver's requested torque Tr (S5).

After the "engine ignition control" is performed, the motor control unit 102 performs "motor torque control" (S6) that controls the motor torque Tm. Namely, in this state, the engine torque Te increases although the driver's requested torque Tr is, e.g., constant. Thus, it is necessary to set the motor torque Tm accordingly. That is, a value obtained by subtracting the engine torque Te from the requested torque Tr is set as the motor torque Tm, and a command is sent to the motor 2 to output the set motor torque Tm.

After the "motor torque control" is performed, the clutch control unit 103 performs "clutch torque control" that controls the clutch torque Tc. That is, in this "clutch torque control," the clutch torque Tc is set to clutch full engagement torque that brings the clutch 4 into a fully engaged state. Namely, the clutch 4 is controlled to be in the fully engaged state by the clutch control unit 103 (S7).

After the "clutch torque control" is performed, the shift control unit 101 performs "shift control" that controls the speed ratio of the speed change mechanism 3. Namely, in this "shift control," in order that the engine 9 is kept at the engine start target rotational speed, a value obtained by dividing the engine start target rotational speed by the actual output rotational speed detected by the output shaft rotational speed sensor 93 is calculated as the next ratio command value to be sent as a command to the speed change mechanism 3, and the ratio command value thus calculated is sent as a command from the shift control unit 101 to the speed change mechanism 3. That is, shift control is performed so that the rotational speed of the input shaft 6 is equal to the engine start target rotational speed according to the vehicle speed V (output shaft rotational speed).

By this control (S4, S5, S6, S7, S8), the driving source that outputs the driver's requested torque Tr is gradually switched from the motor 2 to the engine 9 so that the requested torque Tr is output by the engine torque Te. That is, the vehicle is switched from the EV traveling to the engine traveling.

Then, the engine start determination unit 106 sets the engine start request flag to off (S9), and the on state of the engine start request flag is no longer detected in step S2 (NO in S2). Namely, the vehicle is completely switched from the EV traveling to the engine traveling.

[Travel Example Upon Engine Start]

Figure 5:
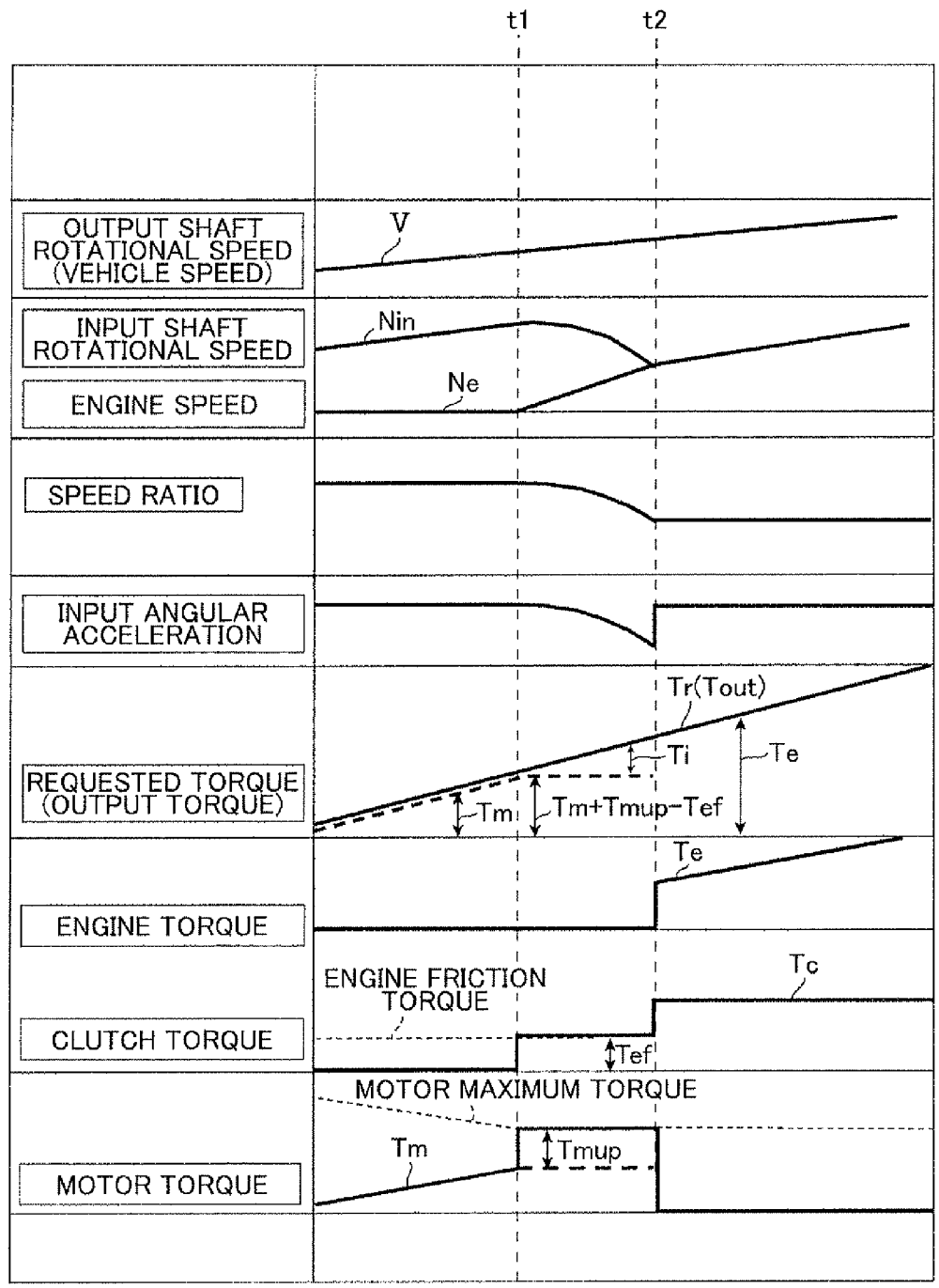
FIG. 5 is a timing chart showing an example of traveling upon engine start.

A travel example upon engine start will be described based on the timing chart of FIG. 5 with reference to FIGS. 1 to 4.

For example, if the vehicle is in such a traveling state that the driver gradually steps on the accelerator pedal (the accelerator operation amount is gradually increased) during EV traveling, and the gradually increasing requested torque Tr is detected by the requested torque detection unit 108, the motor 2 is controlled by the motor control unit 102, and the motor torque Tm is output according to the requested torque Tr. The vehicle is thus accelerated and the vehicle speed V is increased, and the input rotational speed (input shaft rotational speed) Nin (motor rotational speed Nm) is also increased.

At time t1, the vehicle reaches, e.g., a predetermined vehicle speed V, and the engine start determination unit 106 determines that the engine 9 should be started based on the fact that the motor 2 has reached its output limit (the motor maximum torque minus the additional torque Tmup), and sets the engine start request flag to on (YES in S2). Then, the engine start control unit 105 starts the "engine rotation increase phase" because the differential rotational speed between the input rotational speed Nin and the engine speed Ne is larger than the engagement determination differential rotational speed that determines if the clutch 4 is in the engaged state (that is, because the clutch 4 is not in the engaged state) (NO in S3).

Thus, the clutch control unit 103 performs the "clutch torque control" (S10), and performs slip engagement of the clutch 4 so that the clutch torque Tc is equal to the engine start clutch torque Tef that is slightly larger than the friction torque of the engine 9. Subsequently, the motor control unit 102 performs the "motor torque control" (S11, S12) to output the motor torque Tm that has been output based on the requested torque Tr, and the additional torque Tmup added to the maximum torque of the motor 2.

Then, if the driver further steps on the accelerator pedal and the requested torque Tr is increased in a period from time t1 to time t2, the requested torque Tr cannot be output only by the output torque of the motor 2 because the motor 2 is in the maximum torque outputting state as it outputs the additional torque Tmup and the clutch torque Tc as the engine start clutch torque Tef reduces the output torque Tout. Accordingly, if this state continues, the output torque Tout is separated from the requested torque Tr as shown by broken line in FIG. 5, namely hesitation occurs.

Accordingly, the start upshift control unit 107 starts the "upshift process" by sending a command to the shift control unit 101 to perform the "shift control" (S100), and upshifts the speed change mechanism 3 so that the inertia torque Ti corresponding to the torque shortage is output. Thus, the input shaft rotational speed Nin decreases, and the speed ratio decreases accordingly, whereby the input angular acceleration is decreased (i.e., decelerated).

Thus, in the state where the additional torque Tmup of the motor 2 (motor maximum torque) is output, the clutch 4 is engaged and the engine start clutch torque Tef (the friction torque of the engine 9) reduces the output torque Tout, and the shortage of the output torque Tout is compensated for by the inertia torque Ti in the rotating system on the input side of the hybrid drive device 1. That is, the output torque Tout as the total torque is output as requested by the requested torque Tr.

The "engine start phase" is started at time t2. The engine control unit 104 performs the "engine ignition control" to ignite the engine 9 (S4), and increases the engine torque Te to the requested torque Tr (S5), and the motor control unit 102 performs the "motor torque control" to set the motor torque Tm to a value obtained by subtracting the engine torque Te from the requested torque Tr (in this case, the motor torque Tm is set to 0 because all the requested torque Tr is output by the engine torque Te) (S6). Moreover, the clutch control unit 103 performs the "clutch torque control" to control the clutch torque Tc to the clutch full engagement torque (S7). That is, the clutch 4 is brought into the fully engaged state.

Thereafter, the engine torque Te of the engine 9 is primarily used, and the power is assisted or regenerated as appropriate by using the motor torque Tm of the motor 2 so that the required torque Tr is achieved, and the speed ratio is controlled as appropriate so that a fuel efficiency value of the engine 9 is as close to an optimal fuel curve as possible.

[Conclusion of Present Embodiment]

As described above, according to the control device 100 of the hybrid drive device 1, as the engagement control of the clutch 4 is performed by the clutch control unit 103 in response to the command of the engine start control unit 105, the start upshift control unit 107 sends a command to the shift control unit 101 to upshift the speed ratio of the speed change mechanism 3 to reduce the rotational speed of the input shaft 6 (the input shaft rotational speed Nin), whereby the inertia torque is generated by the rotating system on the input side of the hybrid drive device 1. Accordingly, the output torque Tout as the sum of the motor torque Tm of the motor 2 and the inertia torque Ti can be output upon start of the engine 9. This can reduce hesitation that occurs upon engine start, without, e.g., reducing the EV travel region (the EV travel region can be used up to near the limit where the motor 2 reaches the maximum torque upon engine start).

The start upshift control unit 107 calculates the torque shortage based on the requested torque Tr and the motor torque Tm of the motor 2, and controls the shift speed in the upshift (changes the speed ratio in every control cycle) based on the calculated torque shortage, thereby controlling the magnitude of the inertia torque Ti to be generated. Thus, the inertia torque of the rotating system on the input side of the hybrid drive device 1 can be output according to the requested torque Tr, and variation in output torque Tout which occurs upon engine start can be accurately suppressed.

Moreover, since the speed change mechanism 3 is a so-called stepless speed change mechanism, the shift speed of the upshift can be controlled as appropriate, whereby appropriate inertia torque can be generated.

The above embodiment is described with respect to an example in which the speed change mechanism 3 is a cone ring type stepless speed change mechanism. However, the present invention is not limited to this, and the speed change mechanism 3 may be a belt type stepless speed change mechanism or a toroidal type stepless speed change mechanism. Alternatively, the speed change mechanism 3 may be any stepped automatic speed change mechanism capable of adjusting inertia torque so as to adjust the shift progress ratio etc. Namely, the speed change mechanism 3 may be any speed change mechanism capable of controlling upshift.

Although the hybrid drive device 1 including one motor 2 between the engine 9 and the speed change mechanism 3 is described as an example in the present embodiment, the present invention is not limited to this, and the hybrid drive device 1 may be, e.g., a hybrid drive device including a second motor drivingly coupled to the output shaft 24 etc. or including an in-wheel motor in the driving wheels 10.

The control device of the hybrid drive device according to the present invention can be used for hybrid vehicles such as passenger cars and trucks, and are preferably used particularly for those hybrid vehicles for which hesitation that occurs upon engine start is required to be reduced.

The invention claimed is:

1. A control device of a hybrid drive device, comprising:
a shift control unit that performs shift control of a speed change mechanism shifting a speed ratio between an input member and an output member drivingly coupled to a driving wheel;
a motor control unit that performs drive control of a motor drivingly coupled to the input member;
a clutch control unit that performs engagement control of a clutch interposed between an engine and the input member;
an engine start determination unit that determines that the engine should be started, from a state where the clutch is disengaged during traveling of a vehicle to stop the engine and the vehicle is traveling by driving torque of the motor;
an engine start control unit that, when it is determined by the engine start determination unit that the engine should be started, sends a command to the clutch control unit to perform the engagement control of the clutch and to increase torque capacity of the clutch, thereby increasing a rotational speed of the engine based on rotation of the input member, and starting combustion of the engine; and
a start upshift control unit that, according to the engagement control of the clutch by the engine start control unit, sends a command to the shift control unit to upshift the speed ratio of the speed change mechanism to reduce a rotational speed of the input member, thereby generating inertia torque by the speed change mechanism, wherein
when the engine is started, output torque as a sum of the driving torque of the motor and the inertia torque is output to the driving wheel.

2. The control device of the hybrid drive device according to claim 1, further comprising:
a requested torque detection unit that detects driver's requested torque, wherein
the start upshift control unit controls a magnitude of the inertia torque to be generated, by controlling a shift speed in the upshift based on the requested torque and the driving torque of the motor.

3. The control device of the hybrid drive according to claim 1, wherein the speed change mechanism is a stepless speed change mechanism.

4. The control device of the hybrid drive according to claim 2, wherein
the speed change mechanism is a stepless speed change mechanism.

* * * * *